United States Patent [19]

Kanoh et al.

[11] Patent Number: 5,549,212
[45] Date of Patent: Aug. 27, 1996

[54] METHOD FOR FORMING ROUGH SURFACE WITH CONTROLLED CONVEX SHAPE

[75] Inventors: Hiroshi Kanoh; Shinichi Nishida; Eishi Mizobata, all of Tokyo, Japan

[73] Assignee: NEC Corporation, Tokyo, Japan

[21] Appl. No.: 364,454

[22] Filed: Dec. 27, 1994

[30] Foreign Application Priority Data

Dec. 28, 1993 [JP] Japan .................... 5-334163

[51] Int. Cl.$^6$ .............. B44C 1/22; C03C 15/00; B29C 37/00
[52] U.S. Cl. ............... 216/24; 216/11; 216/39; 216/41
[58] Field of Search ............ 156/651.1, 653.1, 156/655.1, 657.1, 659.11, 661.11; 216/2, 11, 24, 26, 39, 41; 430/323, 321

[56] References Cited

U.S. PATENT DOCUMENTS

| | | | |
|---|---|---|---|
| 3,542,453 | 11/1970 | Kantor | 216/24 X |
| 4,610,502 | 9/1986 | Nicia et al. | 216/26 X |
| 4,610,757 | 9/1986 | Khoe et al. | 216/24 |
| 5,004,673 | 4/1991 | Vlannes | 216/24 X |
| 5,389,313 | 2/1995 | Imataki et al. | 216/11 |

FOREIGN PATENT DOCUMENTS 58-125084  7/1983  Japan .

OTHER PUBLICATIONS

Koizumi, T. et al., "Reflective Multicolor LCD (II) : Improvement in the Brightness", *Proceedings of the SID*, vol. 29/2, 1988, pp. 157–160.

*Primary Examiner*—William Powell
*Attorney, Agent, or Firm*—Young & Thompson

[57] ABSTRACT

First two or more layers are formed on the substrate, the layers having different etching rates such that the etching rates ascend from a bottom layer to a top layer. Second, a mask pattern is formed on the surface of the layers, the mask pattern comprising a plurality of islands each having a predetermined shape. Finally, isotropic etching is performed on the surface of the layers until a desired convex shape is formed on the surface of the layers. The desired convex shape on the surface of the layers is determined by the etching rate ratios of the layers. The etching rate of each layer is controlled by layer formation conditions such as a curing temperature for organic materials, and a flow rate ratio of source gases for inorganic materials.

24 Claims, 4 Drawing Sheets

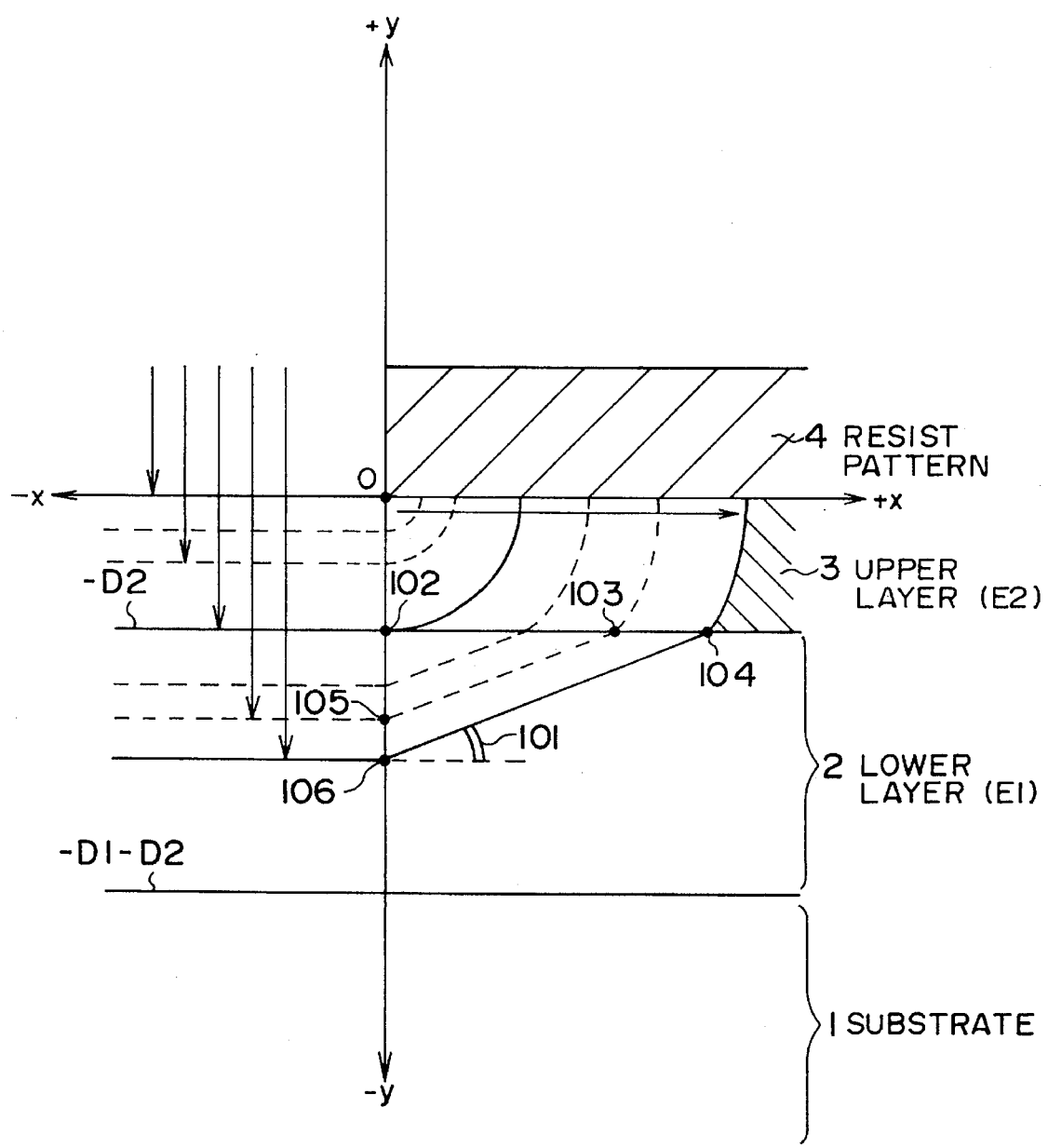

ETCHING RATE: E3>E2>E1

METHOD FOR FORMING ROUGH SURFACE WITH CONTROLLED CONVEX SHAPE

BACKGROUND OF THE INVENTION

1. Field of the Invention

The present invention relates to rough surface formation, more particularly, to a method of forming a reflector having a rough surface which can be applied to reflective-type displays including a reflective LCD (liquid crystal display).

2. Description of the Prior Art

The surface roughness of an LCD reflector, especially its convex shape, is a very important factor in determining the viewing-angle range of brightness. In order to realize a bright LCD reflector, there have been proposed various methods for forming the rough surface of the LCD reflector.

Polishing the surface of a glass substrate is described in the paper "Reflective Multicolor LCD (II): Improvement in the Brightness" by Koizumi et al.(Proceedings of the SID Vol. 29/2, 1988 p. 159). In this method, the planar surface of a glass substrate is polished using an abrasive and then etched using a hydrofluoric acid solution to make the glass surface rough. The rough glass surface is covered with silver by vacuum evaporation.

Another method using a photolithography technique is disclosed in Japanese Patent Laid-open Publication No. Sho 58-125084. According to this method, after forming a photoresist pattern on a polyimide film, the polyimide film is etched using the photoresist pattern as a etching mask, causing the surface of the polyimide film to be rough. Subsequently, the rough surface of the polyimide film is covered with aluminum.

In the polishing method, however, it is difficult to desirably control the convex shape of the glass surface in order to accurately produce target reflective properties. The reason is that such a convex shape depends on the conditions of an abrasive, polishing, and etching with a hydrofluoric acid solution.

On the other hand, in the method using the photolithography technique, although the convex shape of the rough surface can be accurately controlled by using a mask pattern, it is fundamentally difficult to directly control the convex slope of the rough surface.

SUMMARY OF THE INVENTION

It is an object of the present invention to provide a method for forming a rough surface having a desired convex slope.

It is another object of the present invention to provide a method for forming a reflector having a convex surface that is controlled accurately to provide desired reflective properties.

According to the present invention, first a plurality of layers are formed on the substrate, the layers having different etching rates such that the etching rates ascend from a bottom layer to a top layer. Second, a mask pattern is formed on the surface of the layers, the mask pattern comprising a plurality of islands each having a predetermined shape. Finally, isotropic etching is performed on the surface of the layers until a desired convex shape is formed on the surface of the layers. The desired convex shape on the surface of the layers is determined by the etching rates of the layers. The etching rate of each layer is controlled by layer formation conditions such as a curing temperature for organic materials, and a flow rate ratio of source gases for inorganic materials.

Furthermore, forming the reflective film on the desired convex surface, a reflector having desired reflective properties is obtained.

BRIEF DESCRIPTION OF THE DRAWINGS

FIG. 2 is a partial enlarged schematic illustration for explaining the slope formation of a convex surface in FIG. 1;

DETAILED DESCRIPTION OF THE PREFERRED EMBODIMENTS

Figure 1A:
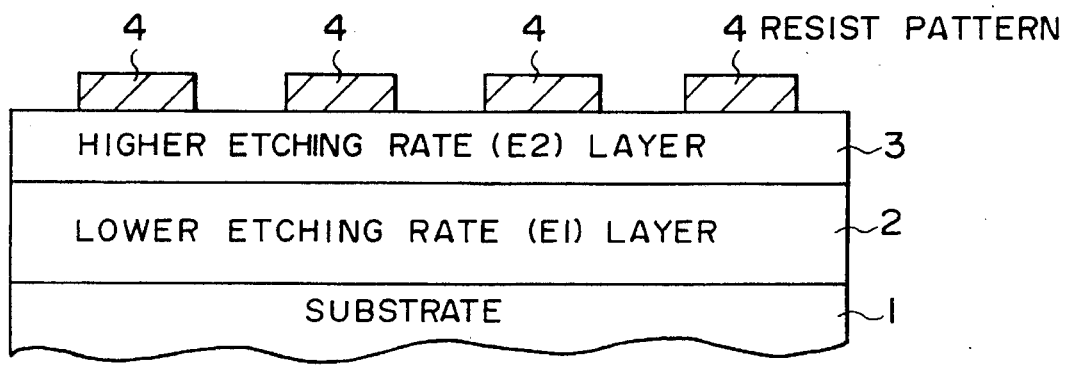
FIGS. 1A–1C are diagrams for explaining a first embodiment of the present invention, each diagram illustrating a schematic sectional view of a workpiece of a reflector according to the embodiment.
Figure 1B:
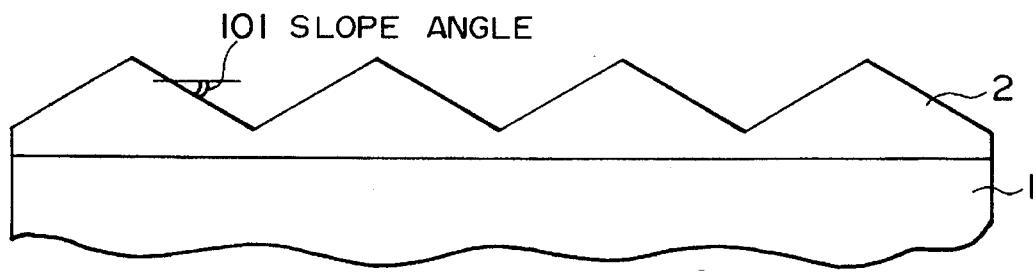
Figure 1C:
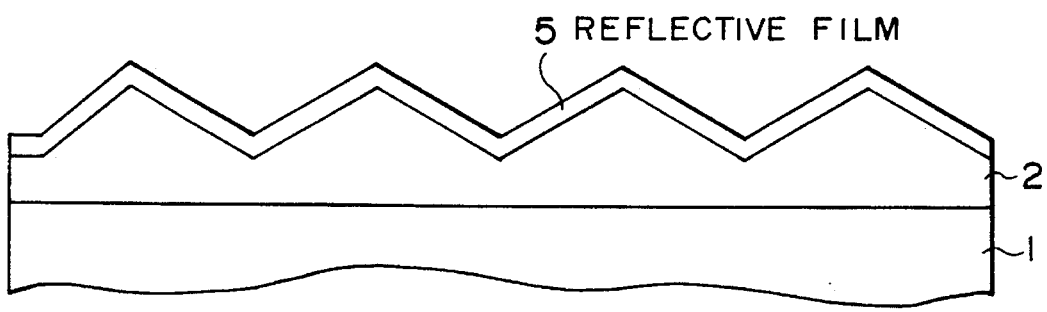

FIGS. 1A–1C illustrate a process for forming a reflector with a rough surface. Referring to FIG. 1A, on a substrate 1 are formed a layer 2 and then a layer 3 using an ordinary chemical vapor-phase deposition (CVD). These layers 2 and 3 are comprised of the same materials but having different compositions, resulting in different etching rates. As shown in FIG. 1A, the layer 3 has a higher etching rate than the layer 2. Subsequently, a resist layer is coated on the layer 3 and then patterning is performed to form a resist pattern 4.

Using the resist pattern 4 as a mask, the layers 2 and 3 are etched by isotropic etching. Since the layer 3 is isotropically etched fast, an undercut or side-etching occurs under each resist pattern 4 and then the layer 2 is etched more slowly. This process, as described later, causes the rough convex surface of the layer 2 have a certain slope angle 101, as shown in FIG. 1B. The slope angle 101 of the convex shape can be controlled accurately by arranging the etching rate ratio (E2/E1) of the layers 2 and 3. Finally, as shown in FIG. 1C, a reflective film 5 is deposited on the rough surface of the layer 2 by vacuum evaporation to form a desired reflector.

Referring to FIG. 2, the etching process will be described hereinafter in detail. The lower layer 2 of thickness D2 and the upper layer 3 of thickness D1 having different etching rates are deposited on the substrate 1 by changing the material composition thereof. After the resist pattern 4 is formed by the photolithography technique, the isotropic etching is performed. The isotropic etching is advanced from the upper layer surface which is not covered with the resist layer 4 vertically toward the lower layer 2 and simultaneously horizontally toward under the resist pattern 4. As etching further proceeds, the lower layer 2 is exposed to the etchant. The etching then proceeds from a boundary point 102 between the upper layer 3 and the lower layer 2 toward boundary points 103 and 104 in the +x direction and toward etching points 105 and 106 in the −y direction. Therefore, a slope angle 101 of the convex surface is determined by the ratio of the distance between the points 102 and 104 to the distance between the points 102 and 106. That is, the slope angle 101 is determined by the ratio of the etching rate E2 of the upper layer 3 to the etching rate E1 of the lower layer 2.

Two examples according to the first embodiment are described below.

EXAMPLE 1

FIGS. 3A–3F show a process for manufacturing a reflector. In this example, a silicon nitride film is used as a material of the lower and the upper layers 2 and 3, and the plasma enhanced CVD (PECVD) is employed to form a silicon nitride film. The composition of the silicon nitride film can be easily controlled by varying the flow rates of source gases, monosilane gas and ammonia gas. As described above, different compositions cause different etching rates.

Figure 3A:
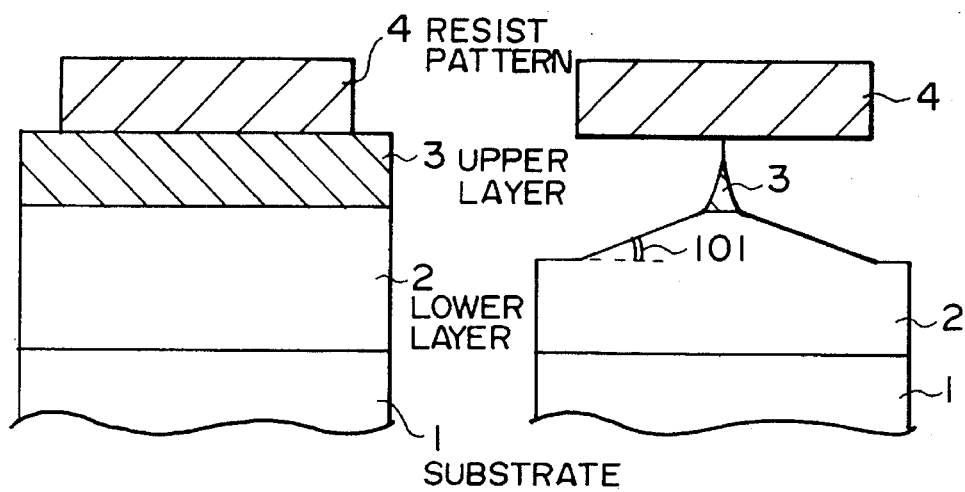
FIGS. 3A–3F are diagrams illustrating a detailed process of convex surface formation in FIG. 1.

First, as shown in FIG. 3A, on the substrate 1 are formed the lower layer 2 having a thickness of 1 μm (D1) and then the upper layer 3 having a thickness of 0.2 μm (D2) by using PECVD. By the flow rate ratio of monosilane gas to ammonia gas varying in the range of 1 to 0.1, the etching rate ratio (E2/E1) can be set to 10 when a hydrofluoric acid solution is used (wherein the etching rates of the lower layer 2 and the upper layer 3 are referred to as E1 and E2, respectively). Subsequently, a photoresist layer (Product name: OFPR-800, by Tokyo Ohka Kogyo Co., LTD. ) is coated on the upper layer 3 and then patterning is performed to form a resist pattern 4, following the conditions recommended by Tokyo Ohka Kogyo Co., LTD. In this case, the resist pattern 4 is shaped like a square of 5 to 30 μm. The shape of the pattern 4 is not limited to this.

Figure 3D:
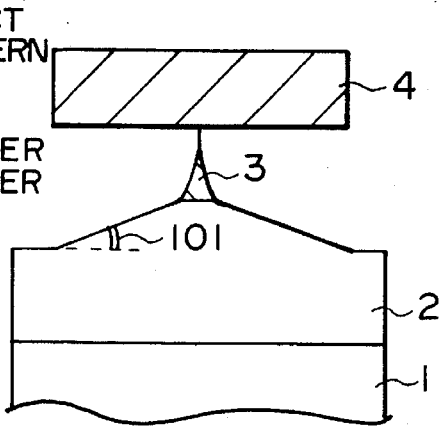
Figure 3B:
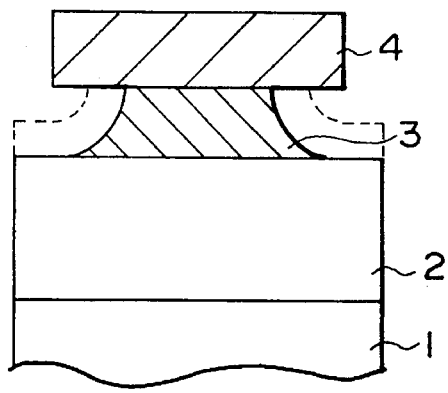

Using the resist pattern 4 as a mask and a hydrofluoric acid solution as an etchant, the layers 2 and 3 are isotropically etched. The isotropic etching is advanced from the surface of the upper layer 3, which contacts the etchant, toward the substrate 1. Due to isotropic etching, the etching is simultaneously advanced toward below the resist pattern 4, resulting in undercut of the upper layer 3 as shown in FIG. 3B.

Figure 3E:
Figure 3C:
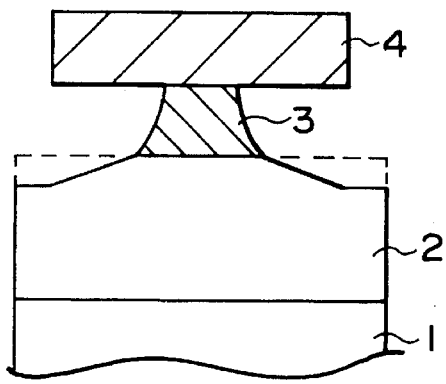

As shown in FIG. 3C, when reaching the surface of the lower layer 2, the etching is started toward the substrate 1 at the etching rate E1 lower than the rate E2. Since the etching is also advanced horizontally under the resist pattern 4 at the etching rate E2, the increasing surface area of the lower layer 2 is exposed to the etchant. In this way, the isotropic etching proceeds to form a slope under each resist pattern 4 on the lower layer 2 as shown in FIG. 3D. And then the upper layer 3 is completely etched and removed.

As a result, as shown in FIG. 3E, there is formed a rough surface of the lower layer 2 with an slope angle 101 in accordance with the etching ratio of the lower and the upper layers 2 and 3.

Figure 3F:
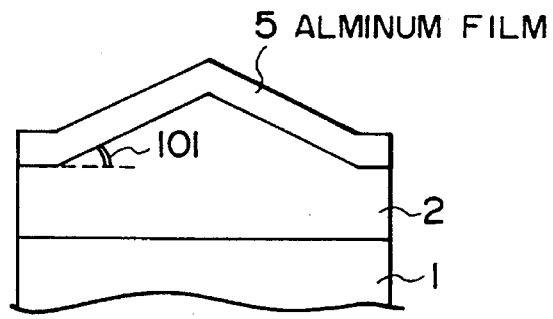

Finally, as shown in FIG. 3F, an aluminum film 5, which is a metal film used as a reflective layer with a high reflectivity, is formed on the top to form the reflector.

In this example, the slope angle 101 of the convex surface on the lower layer 2 was an angle of five (5) degrees.

Figure 4:
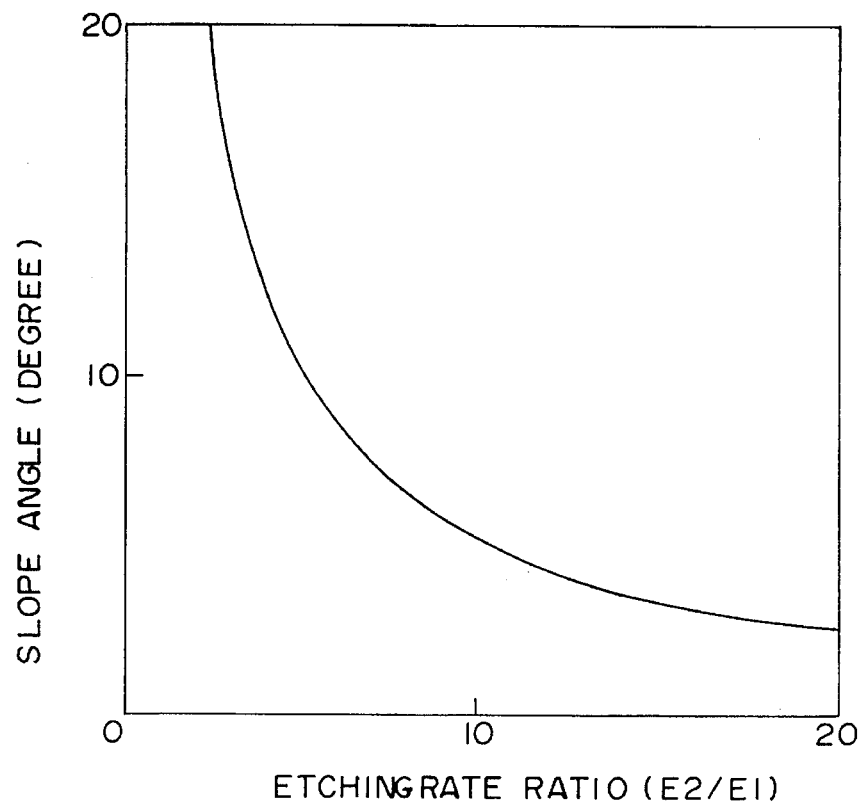
FIG. 4 is a graph illustrating a relationship between an etching rate ratio of two layers and a slope angle of the convex surface in the first embodiment.

As shown in FIG. 4, a desired slope angle 101 is obtained by varying the etching ratio (E2/E1) of the lower layer 2 and the upper layer 3.

EXAMPLE 2

In this example, a polyimide film (Product name: RN-812, by Nissan Kagaku Inc. ) is used as the lower layer 2 and the upper layer 3. A polyimide film is spin-coated on a glass substrate, and calcination is performed at a temperature of 90° C. for 10 minutes and then curing at 160° to 250° C. for 30 minutes. The resultant film thickness after firing is adjusted to 1 μm. By the curing temperature varying in the range of 160° to 250° C., the etching rate of the polyimide film can be changed widely. When the etchant is NMD-3 (Product name by Tokyo Ohka Kogyo Co., LTD. ), the etching rate ratios (E2/E1) of the lower and the upper layers 2 and 3 can be changed from 1 to 1,000.

In this example, there are formed the lower polyimide layer 2 of 1 μm and the upper polyimide layer 3 of 0.2 μm on the substrate 1, the etching rate ratio (E2/E1) being set to ten (10). Using the same process as the example 1 as shown in FIGS. 3A–3F, a rough convex surface of the lower polyimide layer 2 is obtained. It is to be noted that the above etchant (NMD-3) is used for isotropic etching of the lower layer 2 and the upper layer 3. In other words, by setting the respective curing temperatures of the lower layer 2 and the upper layer 3, the slope angle 101 of the convex surface on polyimide film can be easily controlled.

Although polyimide and silicon nitride are used as the lower and the upper layers 2 and 3 in the above embodiment, this invention is not limited to these materials. Any organic, inorganic, or metal film can be used as long as its etching rate can be controlled by changing the film formation conditions. Those films which meet this requirement are as follows: organic films (including optically hardened films) such as polyimide and acrylic resin films that can meet the requirement by adjusting the curing temperature (exposure conditions for optically hardened films), inorganic films such as silicon oxide and amorphous silicon films that can meet the requirement by adjusting the flow ratio of source gases or the formation temperature, and metal materials such as Ta and Al and their oxides.

Figure 5A:
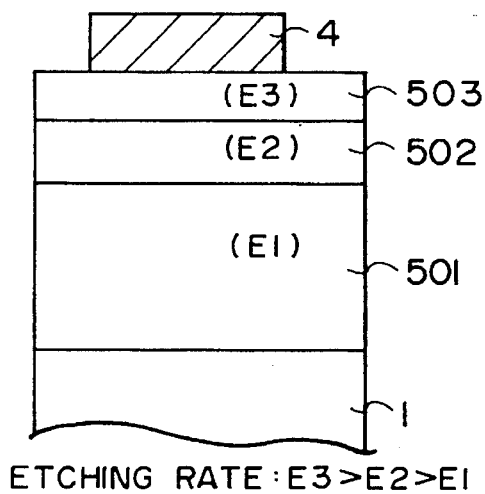
FIGS. 5A and 5B are diagrams for explaining a second embodiment of the present invention, each diagram illustrating a partial schematic sectional view of a workpiece of a reflector according to the embodiment.
Figure 5B:
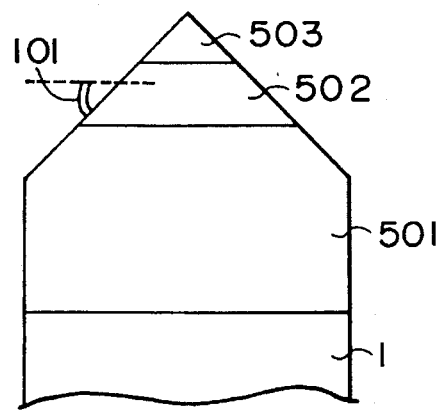

FIGS. 5A and 5B show a second embodiment of the present invention. Referring to FIG. 5A, three layers 501–503 are sequentially deposited on the substrate 1. The respective layers are comprised of silicon nitride or polyimide, and having etching rates E1, E2, and E3 (E1<E2<E3). By adjusting the respective film thicknesses and the etching rate ratios, E2/E1 and E3/E2, a desired slope angle 101 of the convex surface can be obtained as shown in FIG. 5B.

Although, in the above embodiments, two layers or three layers having different etching rates are formed on the substrate, this invention is not limited to these aspects. The slope angle 101 of the convex surface can be partially controlled by increasing the number of stacked layers.

As described above, according to the present invention, by using a conventional photolithographic and etching processes, the accurate control of a convex surface is achieved. Therefore, a reflector having a desired reflective properties such as a viewing-angle range of brightness can be easily fabricated.

We claim:

1. A method for forming a rough light-reflective surface on a substrate, comprising the steps of:

forming a plurality of layers on the substrate, the layers having different etching rates for an etching condition such that the etching rates ascend from a bottom layer to a top layer of the layers;

forming a random mask pattern on the surface of the layers, the mask pattern comprising a plurality of islands each having a shape; and etching isotropically the surface of the layers in the etching condition until a desired convex shape free from any flat portion is formed on the surface of the layers.

2. The method as set forth in claim 1, wherein the desired convex shape on the surface of the layers is determined by the etching rates of the layers.

3. The method as set forth in claim 1, wherein the layers comprise an organic material, the etching rate of each of the layers being controlled by its curing temperature.

4. The method as set forth in claim 1, wherein the layers comprise an inorganic material formed from source gases, the etching rate of each of the layers being controlled by a flow rate ratio of the source gases.

5. A method for forming a rough light-reflective surface on a substrate, comprising the steps of:

forming a first layer on the substrate, the first layer comprising a certain material having a first etching rate for an etching condition;

forming a second layer on the first layer, the second layer comprising the certain material having a second etching rate greater than the first etching rate for said etching condition;

forming a random mask pattern on the second layer, the mask pattern comprising a plurality of islands each having a shape; and etching isotropically the first and second layers in said etching condition until a desired convex shape free from any flat portion is formed on the surface of the substrate.

6. The method as set forth in claim 5, wherein the desired convex shape on the surface of the substrate is determined by an etching rate ratio of the first layer and the second layer.

7. The method as set forth in claim 5, wherein the certain material comprises silicon nitride.

8. The method as set forth in claim 7, wherein the etching rate of each of the layers is controlled by changing a flow rate ratio of source gases.

9. The method as set forth in claim 5, wherein the certain material comprises polyimide.

10. The method as set forth in claim 9, wherein the etching rate of each of the layers is controlled by its curing temperature.

11. A method for forming a rough light-reflective surface on a substrate, comprising the steps of:

forming a first layer on the substrate, the first layer comprising a certain material having a first etching rate for an etching condition;

forming a second layer on the first layer, the second layer comprising the certain material having a second etching rate greater than the first etching rate for the etching condition;

forming a third layer on the second layer, the third layer comprising the certain material having a third etching rate greater than the second etching rate for the etching condition;

forming a random mask pattern on the third layer, the mask pattern comprising a plurality of islands each having a shape; and etching isotropically the first, the second, and the third layers in the etching condition until a desired convex shape free from any flat portion is formed on the surface of the substrate.

12. The method as set forth in claim 11, wherein the desired convex shape on the surface of the substrate is determined by an etching rate ratio of the first layer, the second layer, and the third layer.

13. The method as set forth in claim 11, wherein the certain material comprises silicon nitride.

14. The method as set forth in claim 13, wherein the etching rate of each of the layers is controlled by changing a flow rate ratio of source gases.

15. The method as set forth in claim 11, wherein the certain material comprises polyimide.

16. The method as set forth in claim 15, wherein the etching rate of each of the layers is controlled by its curing temperature.

17. A method for fabricating a reflector having a rough light-reflective surface comprising the steps of:

forming a plurality of layers on a substrate, the layers having different etching rates for an etching condition such that the etching rates ascend from a bottom layer to a top layer of the layers;

forming a random mask pattern on the surface of the layers, the mask pattern comprising a plurality of islands each having a shape;

etching isotropically the surface of the layers in the etching condition until a desired convex shape free from any flat portion is formed on the surface of the layers; and forming a reflective film on the surface of the layers having the desired convex shape.

18. The method as set forth in claim 17, wherein the desired convex shape on the surface of the layers is determined by the etching rates of the layers.

19. The method as set forth in claim 17, wherein the layers comprises an organic material, the etching rate of each of the layers being controlled by its curing temperature.

20. The method as set forth in claim 17, wherein the layers comprises an inorganic material formed from source gases, the etching rate of each of the layers being controlled by the flow rate ratio of the source gases.

21. A reflector made by the method according to claim 1.
22. A reflector made by the method according to claim 5.
23. A reflector made by the method according to claim 11.
24. A reflector made by the method according to claim 17.

* * * * *